Jan. 29, 1924.
C. SCHOPPER
1,482,268
CLOTHESLINE SUPPORT AND TIGHTENER
Filed Feb. 2, 1922
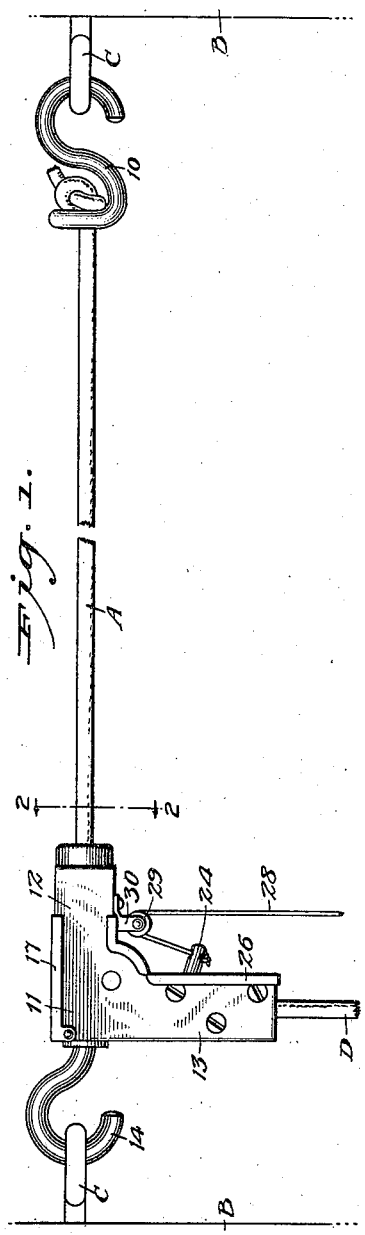
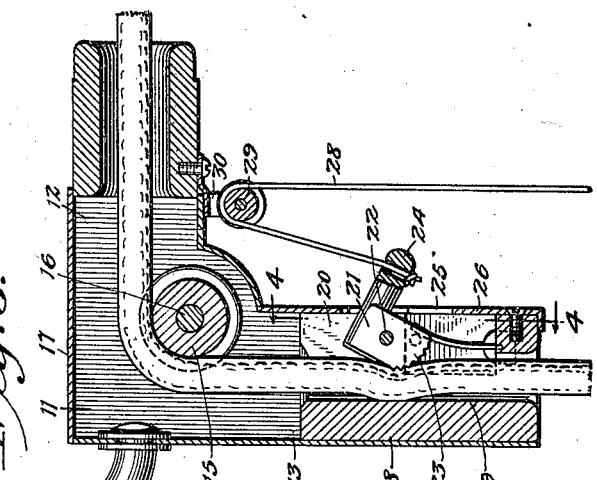
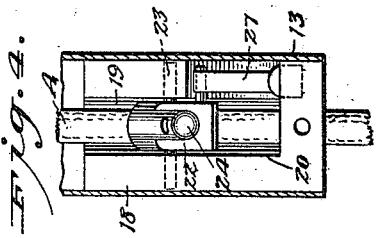
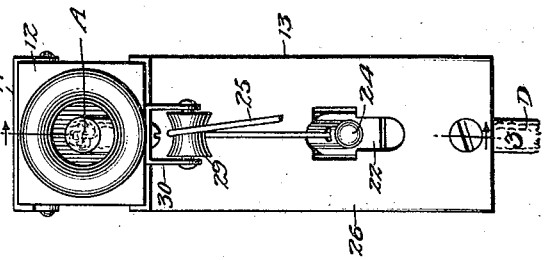
WITNESSES
INVENTOR
C. Schopper
BY
ATTORNEYS Patented Jan. 29, 1924.

1,482,268

UNITED STATES PATENT OFFICE.

CHARLES SCHOPPER, OF NEW YORK, N. Y.

CLOTHESLINE SUPPORT AND TIGHTENER.

Application filed February 2, 1922. Serial No. 533,689.

*To all whom it may concern:*

Be it known that I, CHARLES SCHOPPER, a citizen of Germany, and a resident of the city of New York, borough of Manhattan, in the county of New York and State of New York, have invented a new and Improved Clothesline Support and Tightener, of which the following is a full, clear and exact description.

This invention relates to clotheslines and refers more particularly to elements associated therewith for supporting and tightening the same.

The invention contemplates a means for supporting the opposite ends of a clothesline to eliminate the tying of the same to supports therefor, and to afford means for taking up the slack in the line to prevent sagging thereof.

As a further object the invention contemplates an extremely simple and inexpensive clothesline support and tightening means which permits of the putting up or taking down of the line in an efficient and expeditious manner and which also affords means for lowering the line to permit of the application to and removal of the clothes therefrom where the line is normally suspended at a point above the reach of the user.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a side elevation of a clothesline in applied position, illustrating the same equipped with the supporting and tightening means.

Fig. 2 is a sectional view taken on the line 2—2 of Fig. 1.

Fig. 3 is a sectional view taken approximately on the line 3—3 of Fig. 2.

Fig. 4 is a sectional view taken approximately on the line 4—4 of Fig. 3.

Referring to the drawings by characters of reference, A designates a clothesline, B, B a pair of spaced supporting walls or posts which are preferably provided with screw eyes or bolts C. One end of the clothesline A is provided with an attaching hook 10 secured thereto in any desired manner whereby said extremity of the line may be removably associated with the screw eye or bolt C. The means for supporting the opposite or free end of the line A from the opposite screw eye of bolt C consists of a tubular member 11 including right angularly disposed horizontal and vertical arms 12 and 13 and through which the free end of the line is passed. The member 11 is provided with an attaching hook 14 secured thereto at the juncture of the arms at a point substantially in axial alignment with the horizontal arm 12. The attaching hook 14 is designed to be received by the screw eye C on the opposite wall or port B. A guide sheave or pully 15 is mounted on a transverse shaft 16 within the member 11 substantially at the juncture of the arms 12 and 13. The upper side of the arm 12 is provided with an opening which is normally closed by means of a hinged cover 17. The vertical arm 13 has mounted therein an insert block 18 having a central bore 19 through which the free end of the rope is passed after the same is trained over the guide sheave or pulley 15. The insert block 18 is provided with a slot 20 communicating with the bore in which a gripping jaw 21 is pivoted as at 22. The gripping jaw is provided with a serrated eccentric face 23 and an angularly disposed manipulating arm 24, the latter projecting outwardly through a slot 25 in the removable cover plate 26 of the vertical arm. A leaf spring 27 coacts with the gripping jaw 21 to normally force the gripping face 23 thereof into engagement with the free end of the line whereby a pull exerted on the rope in a direction to effect its withdrawal from the member 11 serves to effect the bighting and tighter gripping of the jaw therewith, while at the same time the arrangement permits of free movement of the line in the opposite direction. The manipulating arm 21 is connected to a releasing cable 28 which is trained over a guide pulley 29 supported in a bracket 30 secured to the under side of the horizontal arm 12.

In use of the device the attaching hook 10 is engaged with one of the screw eyes C and the attaching hook 14 with the opposite screw eye C, thereby suspending the line A between the supports B. The operator by grasping the free extremity D of the line A and exerting a downward pull thereon may take up the slack or sag in the line due to the action of the gripping jaw 21. Where it is desired to lower or slacken the line for the purpose of applying or removing the clothes, the operator grasps the releasing cable 28 and by exerting a downward pull thereon effects a swinging of the gripping jaw 21 on its pivot to disengage the serrated cam face 23 from the line. To associate the free end of the line with the member 11, the cover 17 is opened to permit of the proper insertion of the line through the horizontal arm, over the guide pulley 15 and through the bore 19. The disposal of the point of attachment of the hook 14 in axial alignment with the arm 12 functions to maintain the arm 12 in a horizontal position whereby the line is maintained out of contact with the inner walls of the arm 12 to prevent friction from wearing the line. By the employment of a supporting and tightening means of the character described in connection with a clothesline, the time and labor incident to the putting up and taking down of the line is minimized and in addition thereto a sagging or slack line is eliminated.

I claim:

1. A clothesline supporting and tightening device comprising an angular tubular member including horizontal and vertical arms, a hook for attaching said member to a support, said hook being secured to said member at a point in axial alignment with the horizontal arm, a guide pulley mounted within said member at the juncture of said arms over which the end of the line is trained, a pivoted gripping jaw in the vertical arm having a cammed serrated surface, and means for normally forcing said arm into engagement with the line, said jaw serving to permit of free movement of the line in a direction to effect the tightening thereof and operating to prevent movement of the same in the opposite direction.

2. A clothesline supporting and tightening device comprising an angular tubular member including horizontal and vertical arms, a hook for attaching said member to a support, said hook being secured to said member at a point in axial alignment with the horizontal arm, a guide pulley mounted within said member at the juncture of said arms over which the end of the line is trained, a pivoted gripping jaw in the vertical arm having a cammed serrated surface, means for normally forcing said arm into engagement with the line, said jaw serving to permit of free movement of the line in a direction to effect the tightening thereof and operating to prevent movement of the same in the opposite direction, and means carried by the angular tubular member depending therefrom connected with the pivoted gripping jaw for moving the same to released position.

CHARLES SCHOPPER.